Jan. 1, 1963  P. J. MILLER  3,071,394
CONTROL VALVE FOR VEHICLE SUSPENSION
Filed Oct. 21, 1960  7 Sheets-Sheet 1

INVENTOR.
PAUL J. MILLER
BY
RICHEY, McNENNY, & FARRINGTON
Donald W. Farrington
ATTORNEYS

Fig. 3

INVENTOR.
PAUL J. MILLER
BY
RICHEY, McNENNY & FARRINGTON
ATTORNEYS

Fig. 4

INVENTOR.
PAUL J. MILLER
BY
RICHEY, McNENNY & FARRINGTON
Donald W. Farrington
ATTORNEYS

Fig. 5

INVENTOR.
PAUL J. MILLER
BY
RICHEY, McNENNY, & FARRINGTON
Donald W. Farrington
ATTORNEYS Jan. 1, 1963 P. J. MILLER 3,071,394
CONTROL VALVE FOR VEHICLE SUSPENSION
Filed Oct. 21, 1960 7 Sheets-Sheet 5

INVENTOR.
PAUL J. MILLER
BY
RICHEY, MCNENNY & FARRINGTON
Donald W. Farrington
ATTORNEYS Jan. 1, 1963   P. J. MILLER   3,071,394
CONTROL VALVE FOR VEHICLE SUSPENSION
Filed Oct. 21, 1960   7 Sheets-Sheet 7

Fig. 10

INVENTOR.
PAUL J. MILLER
BY
RICHEY, McNENNY, & FARRINGTON
Donald W. Farrington
ATTORNEYS

United States Patent Office 3,071,394
Patented Jan. 1, 1963

3,071,394
CONTROL VALVE FOR VEHICLE SUSPENSION
Paul John Miller, Maple Heights, Ohio, assignor to The Weatherhead Company, Cleveland, Ohio, a corporation of Ohio
Filed Oct. 21, 1960, Ser. No. 64,198
15 Claims. (Cl. 280—124)

This invention relates to fluid control valves and more particularly to level control valves for use with vehicle suspension systems which provide multiple operating clearance heights for the vehicle.

One of the current trends in motor vehicle design has been to reduce the over-all height of the vehicle, and in doing so it has been necessary to also reduce the road clearance height beneath the vehicle in order to provide adequate interior height. Furthermore, the effort to produce a smoother and more comfortable ride for the passengers has resulted in a reduction in the stiffness of the suspension springs to allow them to absorb road shocks more readily. These trends have produced problems in conventional suspension systems since variations in the loading of the vehicle produce a wider variation in the clearance height because of the increased deflection of the softer springs under equivalent loads. The reduced operating road clearance resulting from the reduced vehicle height creates a condition of insufficient road clearance when such vehicles are fully loaded.

One proposed solution to this problem has been to employ fluid springs utilizing either air alone, or air together with a hydraulic fluid, under pressure within a bellows type spring member. By varying the amount of fluid within the spring, the static height of the vehicle may be easily regulated to adjust the road clearance height to a predetermined reference level regardless of the load within the vehicle. Such changes have been accomplished by providing a leveling valve which either admits or exhausts fluid from within the spring member in response to variations in clearance spacing between the vehicle frame and the wheels or axles.

Another proposed solution to this problem has been to provide a trim control for use with ordinary mechanical springs such as the conventional helical coil spring. With this arrangement, the upper spring anchor or abutment is made movable relative to the vehicle frame by means of a fluid cylinder and piston arrangement. By employing a leveling valve sensitive to the position of the wheels or axles relative to the vehicle frame, fluid is either admitted to or exhausted from the fluid cylinder to raise or lower the upper end of the suspension spring and thereby control the vehicle clearance height.

It has been proposed that vehicles equipped with fluid pressure leveling units and operating at a relatively low road clearance be given a much higher road clearance for operation over rough or rugged roads. To this end, it has further been proposed that a manual control be provided for the vehicle operator which completely overrides the action of the level valve by increasing the fluid pressure within the spring unit and thereby raises the height of the vehicle to a maximum position. However, this method is unsatisfactory because the increased pressure within the air spring units also creates altered suspension characteristics in the form of a considerably stiffer spring rate and loss of control over spring action. Such changes in the suspension not only create a harsh and unpleasant ride for the occupants of the vehicle, but also adversely affect the roadability and handling characteristics of the vehicle. For these reasons, such methods for providing increased road clearance heights have been usable only for emergency purposes, as in the case where the vehicle has been hung up on an obstruction.

It is therefore an object of the present invention to provide a control system for a vehicle having a fluid controlled suspension system in which the vehicle may be leveled to a reference clearance height regardless of the vehicle load and in which the reference clearance height may be adjusted to different levels without interfering with the leveling action.

Another object of this invention is to provide a control system for a vehicle having a fluid controlled suspension system which provides a leveling action to a reference road clearance height regardless of the vehicle load, in which the reference clearance height may be varied without adversely affecting the suspension characteristics of the vehicle.

Another object of this invention is to provide a control system for vehicles having a fluid controlled suspension system as set forth in the preceding objects in which the control valve employs a fixed valve housing and operating linkage and the reference height is altered by shifting the position of the valve mechanism within its housing and which requires no flexible tubing or piping connections between the valve and the other portions of the fluid system.

Another object of this invention is to provide an adjustable leveling control valve according to the preceding object in which the valve element is readily adaptable for adjustment of the reference clearance height by either electrical, fluid pressure, or mechanical control means.

Still another object of the present invention is to provide a control system for vehicles having a fluid controlled suspension system in accordance with the preceding objects which can be produced at low cost and is simple and trouble-free in operation.

Additional objects and advantages of this invention will readily become apparent to those skilled in the art upon a full comprehension of the invention, several embodiments of which are shown in the accompanying drawings and described in the following detailed description.

Figure 1:
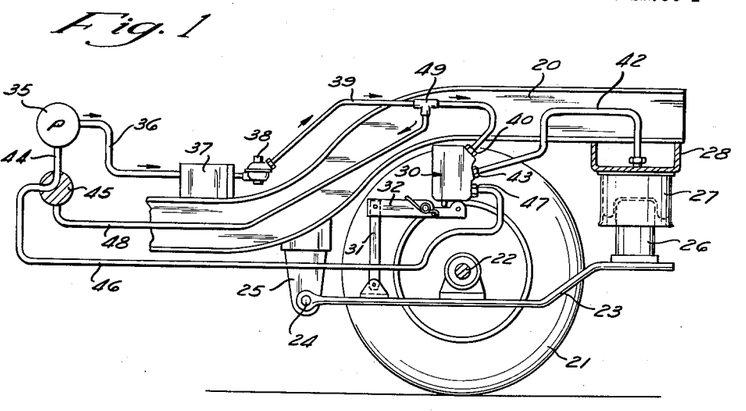
FIG. 1 is a schematic showing of a fluid pressure suspension system for a vehicle wheel according to the present invention.

Referring now to the figures in greater detail, in FIG. 1 there is illustrated a fragmentary portion of a motor vehicle having a chassis member 20 and a wheel 21 mounted on one end of an axle 22. The axle 22 is secured to a suspension arm 23 near the midpoint of the latter, and suspension arm 23 is in turn pivotally mounted at its one end 24 on a depending bracket 25 secured to chassis member 20. The other end of suspension arm 23 carries a piston member 26 of the fluid suspension unit in the form of air spring bellows assembly 27 which is secured at its upper end on a cross member 28 of chassis member 20.

The amount of air within the air spring 27 is controlled by means of the leveling valve indicated generally at 30. The leveling valve 30 is operated by means of a connecting link 31 secured at its lower end to the suspension arm 23 and at its upper end to the actuating or operating arm 32 of leveling valve 30. Thus the motion and relative position of wheel 21, axle 22, and suspension arm 23 with respect to the chassis member 20 are sensed by the leveling valve 30, which produces a leveling action with the air spring assembly 27 in the manner to be described in greater detail hereinafter.

Fluid, in this case atmospheric air, is supplied to the system by means of a pump 35 which is driven by suitable power means such as the vehicle motor or an auxiliary motor. The output from pump 35 is conducted through a line or pipe 36 to a pressurized storage reservoir or fluid accumulator 37 which serves to supply pressurized air to the air spring for a limited time even though pump 35 is not in operation. From the reservoir or accumulator 37, air passes outward through a pressure regulator 38 which may be of any of the usual types well known in the art, to a pressure line 39 connected to an inlet fitting 40 on the leveling valve 30. A suitable connecting pressure line 42 leads from outlet port 43 on leveling valve 30 to the air spring 27.

In addition to the normal intake for atmospheric air, the pump 35 has an inlet line 44 leading from a rotary selector valve 45. A return or exhaust line 46 leads from fitting 47 on the leveling valve 30 back to the selector valve 45 which is also connected through a line 48 to a T-fitting 49 in the pressure line 39 leading to leveling valve 30. The selector valve 45 is of the usual two position type, and in one position connects return line 46 to inlet line 44 leading to pump 35. In its other position, selector valve 45 connects the return line 46 to connecting line 48 and hence to the pressure line 39 and the full pressure as regulated by the output of pressure regulator 38.

Figure 2:
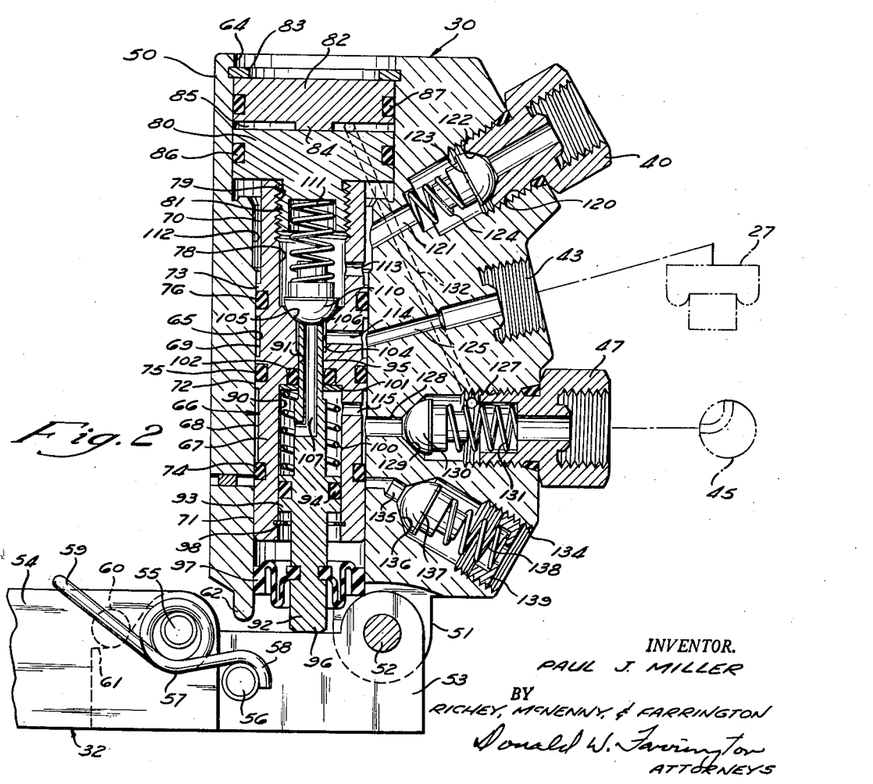
FIG. 2 is a vertical cross-sectional view of the level control valve shown in FIG. 1.
Figure 3:
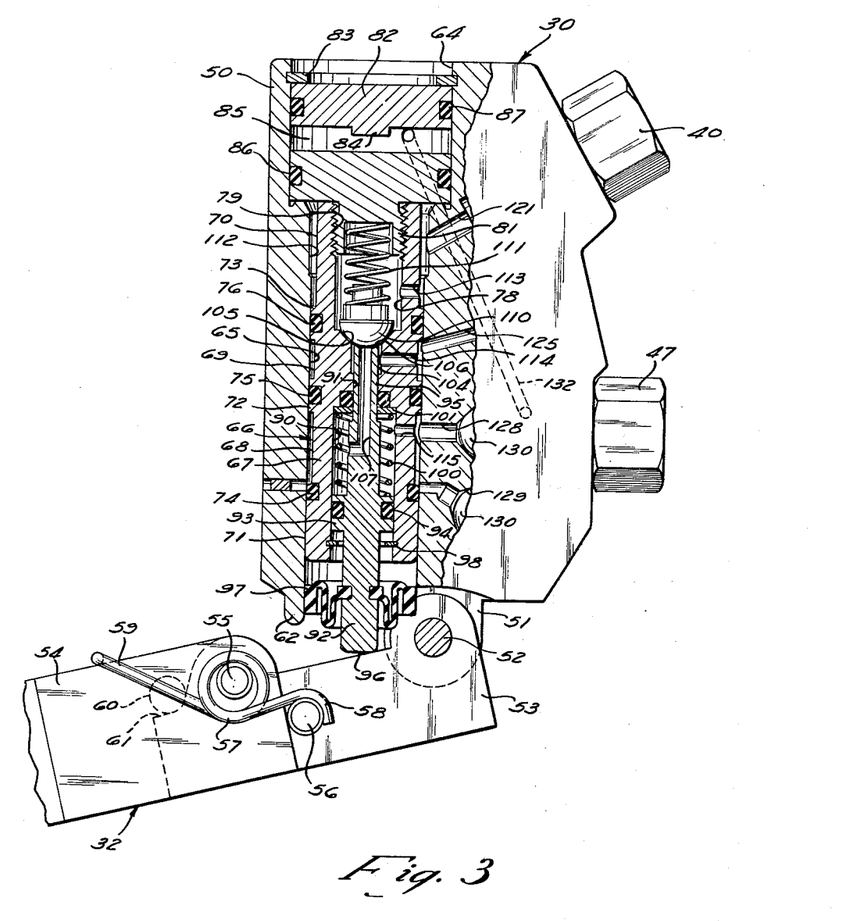
FIG. 3 is a sectional view similar to FIG. 2 showing the valve capsule shifted to the high clearance position.

The leveling valve 30 is shown in greater detail in FIGURES 2 and 3. The leveling valve includes a housing 50 which is rigidly secured to the chassis member 20. At its lower end, housing 50 has a projecting lug 51 on which the operating arm 32 is pivotally mounted on a pivot pin 52. Operating arm 32 comprises two pieces pivotally secured together by a pivot pin 55, with the inner piece 53 being mounted on pivot pin 52, while the outer piece 54 is pivotally secured at the other end to connecting link 31. Operating arm 32 is made in two pieces to prevent over travel of the inner piece 53 due to excessive motion of the connecting link 31. The arm is normally held in a straight position by means of torsion spring 57 which has a body portion positioned around the pivot pin 55 with the ends 58 and 59 fitting over a pin 56 on the inner piece 53 and over the upper side of the outer piece 54. Torsion spring 57 thus tends to rotate the outer piece 54 about pivot pin 55 until stop pin 60 on outer piece 54 abuts against a shoulder 61 on the inner piece 53. Torsion spring 57 is sufficiently strong that normally the pieces 53 and 54 move together as a unit, but if the wheel 21 is exposed to an abnormally high bump, tending to cause the operating arm 32 to rotate upward an excessive amount, the inner piece 53 will rotate about pin 52 until its upper surface contacts a stop lug 62 on housing 50, after which further motion of the inner piece 53 ceases and the outer piece 54 rotates about pivot pin 55 against the force of torsion spring 57. Thus upward movement of the inner piece 53 is limited to a predetermined amount regardless of the motion of the outer piece 54.

The housing 50 has a bore 65 extending vertically therethrough to receive the valve capsule indicated generally at 66. The valve capsule 66 contains the valving elements which control both the admission and exhaust of fluid from the air spring, and is mounted to be shiftable along a vertical axis within the leveling valve housing 50 to regulate the operating position of the air spring and the clearance height of the vehicle. Valve capsule 66 includes a valve body 67 which is fitted within bore 65 to slide relatively freely therein. The valve body 67 is provided with lower, middle and upper grooves 68, 69 and 70, respectively on its periphery. These grooves are recessed below the outer periphery of the valve body and extend circumferentially therearound to divide the outer surface of valve body 67 into lower, middle and upper lands 71, 72 and 73. These lands 71, 72 and 73 are the full diameter of bore 65 and are provided with O-ring seals 74, 75 and 76 to make a fluid tight seal against the wall of bore 65 and thereby prevent the leakage of fluid between the grooves 68, 69 and 70, or out of the valve capsule.

The upper end of valve body 67 is provided with an axially extending cylindrical chamber 78 having internal threads 79 at its upper or outer end. These threads 79 receive a threaded stem 81 of a piston 80. Piston 80 has a larger diameter than that of bore 65 and fits within an enlarged counterbore portion 64 at the upper end of bore 65. A plug 82 is also fitted within counterbore 64 outwardly of piston 80 and it is secured in position against axial movement out of the counterbore by a suitable snap ring 83. The inner face of plug 82 is provided with a small projecting boss 84 to insure that the plug 82 remains spaced apart from piston 80 a sufficient distance to form a chamber 85 therebetween. Both piston 80 and plug 82 are provided with suitable O-rings, 86 and 87, respectively, to prevent leakage of fluid past the piston and plug.

The valve body 67 is also provided with an axially extending bore or chamber 90 in the lower end. Chamber 90 extends upward to join a reduced bore 91 which extends between the chamber 90 in the lower portion of valve body 67 and chamber 78 in the upper portion. A valve rod 92 is positioned within chamber 90 and bore 91 and is provided with a land portion 93 and O-ring 94 to make a fluid tight sealing fit within chamber 90 as the valve rod reciprocates therein. The valve rod 92 also includes a stem portion 95 extending upwardly within bore 91, as well as a tip portion 96 projecting downwardly through chamber 90 and the lower end of bore 65 in the leveling valve housing 50 to contact the upper surface of the inner piece 53 of operating arm 32. A suitable dust seal 97 is fitted on tip portion 96 to close off bore 65 and prevent the entry of dirt and dust therein. A snap ring 98 is fitted within chamber 90 below land 93 to limit downward movement of valve rod 92. A small compression spring 100 is fitted within chamber 90 surrounding the valve rod 92 to bear at the lower end against land 93 and at the upper end against a washer 101 at the upper end of chamber 90. Spring 100 serves to bias the valve rod 92 downwardly to maintain the tip portion 96 in contact with the operating arm. An O-ring seal 102 is fitted within a recess above washer 101 to prevent fluid leakage past the stem portion 95 of valve rod 92.

The upper end portion of bore 91 adjacent the chamber 78 is enlarged to form an annular chamber 104 surrounding stem portion 95. A valve seat 105 is formed on the valve body at the junction between annular chamber 104 and chamber 78, and in like manner the end of stem portion 95 of valve rod 92 is provided with a valve seat 106 around axial bore or passage 107 which extends downward through stem 95 to open into the lower chamber 90. A valve assembly in the form of poppet 110 and compression spring 111 is positioned within the upper chamber 78 to seat against the valve seats 105 and 106.

Bore 65 is provided with an enlarged annular chamber portion 112 surrounding the valve body 67 adjacent the counterbore 64, and the valve body 67 is provided with a port 113 connecting this annular chamber 112 and upper groove 70 to the upper chamber 78 within valve body 67. In like manner, the annular chamber 104 surrounding the valve rod stem portion 95 is provided with a port 114 connecting the annular chamber 104 to the middle groove 69 on valve body 67. Similarly, another port 115 is provided in the valve body 67 connecting the lower chamber 90 to the lower groove 68.

At the upper end of the leveling valve housing 50 there is provided a threaded bore 120 to receive the inlet line fitting 40. A connecting passage 121 extends from threaded bore 120 inwardly to open into the annular chamber 112 surrounding the upper groove 70 on valve body 67. The inlet fitting 40 is provided with a valve seat 122 to receive a check valve poppet 123 under the biasing force of a compression spring 124. Poppet 123 serves to allow pressurized fluid to enter the leveling valve assembly through the inlet fitting 40, but prevents the escape of fluid therefrom should the pressure line 39 break or the pressure therein drop below the operating pressure of the spring unit 27. Directly below the inlet fitting 40 there is located an outlet port 43 leading from the leveling valve to the air spring 27. A drilled passageway 125 extends inwardly from outlet port 43 and opens into bore 65 adjacent the middle groove 69 on valve body 67.

Below the outlet port 43 there is another threaded bore 127 to receive the return line fitting 47. A drilled passageway 128 extends inwardly from threaded bore 127 to open into bore 65 adjacent the lower groove 68 on valve body 67. A valve seat 129 is formed on the housing 50 at the junction of passage 128 and threaded bore 127 to serve as a seat for check valve poppet 130 which is urged inwardly under the force of a compression spring 131 whose other end is anchored in the return line fitting 47. It will be seen that the action of this check valve is to allow fluid to pass outwardly from the space provided by lower groove 68 through the return line 46, but prevent fluid flowing in the reverse direction into the valve through the return line. A drilled passage 132 is located within the valve housing 50 and opens at the lower end into the threaded bore 127 outwardly of poppet 130, and at the upper end opens into the chamber 85 formed between piston 80 and plug 82.

Below the return line fitting 47 is another threaded bore 134 formed in housing 50 to serve as an exhaust port to the atmosphere. A drilled passage 135 connects threaded bore 134 to the axial bore 65 within housing 50. Passage 135 is positioned, as shown in FIG. 2 to open into bore 65 a short distance below the lower most O-ring 74 on lower land 71 when the valve body 67 is in the upper position. A valve seat 136 is formed on the housing at the junction of threaded bore 134 and passage 135 to serve as a seat for check valve poppet 137. Poppet 137 is biased against valve seat 136 under the action of a compression spring 138 whose other end abuts against a vented plug 139 screwed into the threaded bore 134.

The operation of the leveling valve 30 is shown in FIGS. 2 and 3 which show the valve in its normal position and high position, respectively. In the position of FIG. 2, the valve body 67 is in the upper position with piston 80 in abutment with boss 84 on plug 82. This is the position of the valve capsule when the return or exhaust line 46 is connected through the selector valve 45 to the inlet line 44 of pump 35. In this position, pressurized air enters through the inlet fitting 40 to pressurize the annular chamber 112. Since the lower surface of piston 80 surrounding the valve body 67 is under pressure, and the chamber 85 between piston 80 and plug 82 is connected through passage 132 to the inlet line which is at relatively low or atmospheric pressure, the pressure on the lower side of piston 80 will force the piston valve body upwardly into abutting contact with plug 82. In this position, the lower O-ring 74 is above the passage 135 so that the exhaust check valve located in the lowermost threaded bore 134 is inoperative.

As shown in FIG. 2, the operating arm 32 is in the mid position with the valve rod 92 positioned within valve body 67 so that valve poppet 110 makes a sealing contact against both valve seat 105 on valve body 67 and valve seat 106 on valve rod stem 95. By virtue of this double sealing contact, the annular chamber 104 is sealed off from connection with either the upper chamber 78 which is at input line pressure, or with passage 107 in stem 95, which is at the low pressure of the return line. Thus air can neither be admitted to nor exhausted from the air spring. If the operating arm 32 is moved upwards, as will be the case when the load of the vehicle is increased and its clearance height therefore decreased, the valve rod 92 will be forced upward to lift poppet 110 out of contact with valve seat 105. This allows the high pressure fluid within chamber 78 to enter the annular chamber 104 and thereby flow into the air spring 27 to increase the pressure therein and restore the clearance height of the vehicle. As the clearance height is being restored, the operating arm 32 moves downward to allow the valve rod 92 to also move downward under the action of spring 100 until the poppet 110 contacts the valve seat 105 to prevent further flow of fluid into the spring.

If the operating arm 32 is lowered, as would be the case when the load on the vehicle is decreased and the clearance height increased, the valve rod 92 will move downward under the action of spring 100 so that the stem portion 95 and valve seat 106 are withdrawn from poppet 110 which remains seated on valve seat 105. In this position, the annular chamber 104 is connected through passage 107 in valve rod stem 95 to the lower chamber 90 and hence through port 115 to the lower groove 68 on valve body 67. Since the air within the air spring 27 is under pressure, this pressure will cause the poppet 130 to open against the biasing action of spring 131 and thereby allow the excess air within the spring to exhaust through the return line.

It will be noted that so long as the return or exhaust line 46 is at low or atmospheric pressure, the pressurized air from the inlet line acting on the lower side of piston 80 retains the valve body 67 in the upper position, and this valve body does not move at all during leveling action. All of the leveling action and valving is obtained through the movement of the valve rod 92 and the action of poppet 110 seating on the two valve seats 105 and 106. It will be seen that there is only one position of the operating arm 32 which allows the poppet 110 to be seated against both of the valve seats 105 and 106. It is only in this middle position that the air spring 27 is cut off from both inlet and exhaust and it is the location of this position relative to the valve housing 50 and operating arm 32 which determines the clearance height of the vehicle, since the action of the leveling valve is to regulate the air spring to return the operating arm to this intermediate position.

The operating clearance height of the vehicle is increased in the circuit of FIG. 1 by turning the rotary selector valve 45 to the position wherein the return line 46 is connected through line 48 to the pressure line 39. The full inlet pressure is therefore applied to poppet 130 in the return line fitting bore 127 and this poppet valve closes to prevent entry of fluid pressure into the connecting passage 128 and the lower chamber 90 in valve body 67. However, since passageway 132 opens into bore 127 outwardly of poppet 130, fluid at inlet line pressure flows through this passage 132 to the chamber 85 between piston 80 and plug 82. Thus the piston 80 is exposed to the same fluid pressure on both its upper surface and lower surface, but since the lower surface is smaller in area by the cross-sectional area of valve body 67, the new force on piston 80 and valve body 67 will be in the downward direction and will move the valve body 67 downwardly until piston 80 abuts on the lower end of counterbore 64.

As the valve capsule 66 moves downward toward the operating arm 32, the valve rod 92 is moved relative to the valve body to lift poppet 110 off valve seat 105. This allows the pressurized fluid in chamber 78 to pass into chamber 104 and hence into the air spring unit. The increased pressure within the spring raises the vehicle, and an operating arm 32 is rotated downward, the valve rod 92 also moves downward until the poppet 110 is again seated on valve seat 105 and the system is in equilibrium. In this position the air spring 27 will still remain connected to annular chamber 104 through the middle groove 69, and the upper chamber 78 will be connected to the inlet line through the upper groove 70. On the other hand, this movement of valve body 67 moves the lower O-ring 74 on lower land 71 below the passage 135 to connect the lower groove 68 to the outlet check valve assembly within threaded bore 134.

When the valve body 67 is in this position, the valving action of rod 92 is the same as in the previous description of the operation, except that the air exhausted from the air spring 27 now flows outwardly through the passage 135 past poppet 137 to the atmosphere, instead of flowing through the return line which is blocked by the inlet line pressure which holds closed poppet 130. However, since the valve body 67 has moved downwardly, the valve rod 92 will be at a lower position relative to housing 50 and operating arm 32, when poppet 110 seals off both of the valve seats 105 and 106. The operating arm 32 is now in a lower position when the vehicle is level, and it will be seen that the ratio of the distances between tip portion 96 and pivot pin 52 and between pivot pin 52 and link 31 assures that the clearance height of the vehicle will be raised several times the distance through which the valve body 67 has been shifted.

Since the valving action remains the same in this higher position, the air spring 27 operates at precisely the same pressure and under the same operating conditions as when the vehicle was leveled at a lower height. Any change in the loading of the vehicle or the position of the operating arm 32 in this upper position will allow the valve rod 92 to move upwardly and downwardly to either admit the pressurized air to the air spring or exhaust air therefrom to return the vehicle to level at this upper position.

When it is desired to return the vehicle to the lower reference clearance height, the rotary selector valve 45 is returned to the position shown in FIG. 1. The pressure at return line port 47 then drops to a low value and the fluid within chamber 85 exhausts through passage 132. The inlet pressure acting on the underside of piston 80 raises the valve capsule 66 until the top of piston 80 contacts boss 84 on plug 82. Since the valve capsule 66 is moved away from operating arm 32 and valve rod 92 is retained in contact with the operating arm by spring 100, the valve seat 106 is moved away from the poppet 110. This action allows the fluid within the spring unit and in annular chamber 104 to exhaust through the valve rod passage 107 into chamber 90 and from there outward either through outlet passage 135 to the atmosphere or through return line passage 128, depending upon the position of the valve capsule 66 within housing bore 65. After the vehicle is lowered, operating arm 32 returns to the position of FIG. 2 and the valve rod is raised until valve seat 106 again contacts poppet 110 and the system is in equilibrium.

Figure 4:
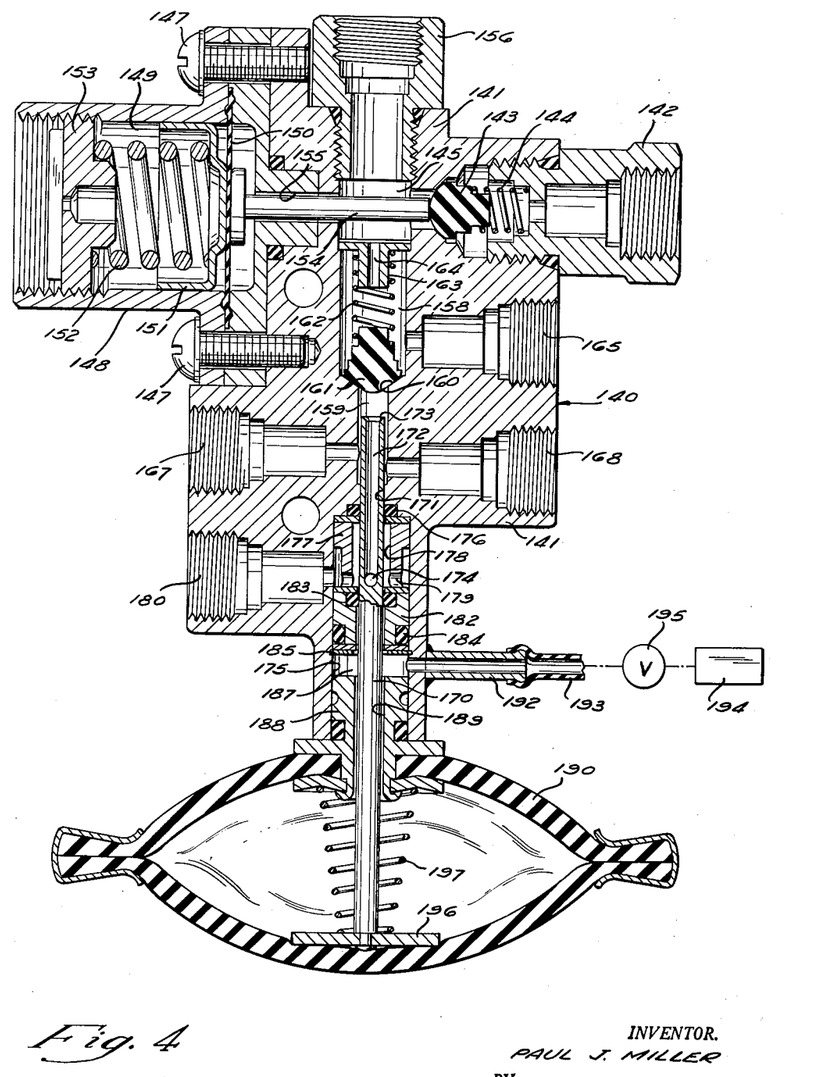
FIG. 4 is a cross-sectional view of a pressure regulator and position control valve adapted for use with the level valve of FIGS. 2 and 3.
Figure 5:
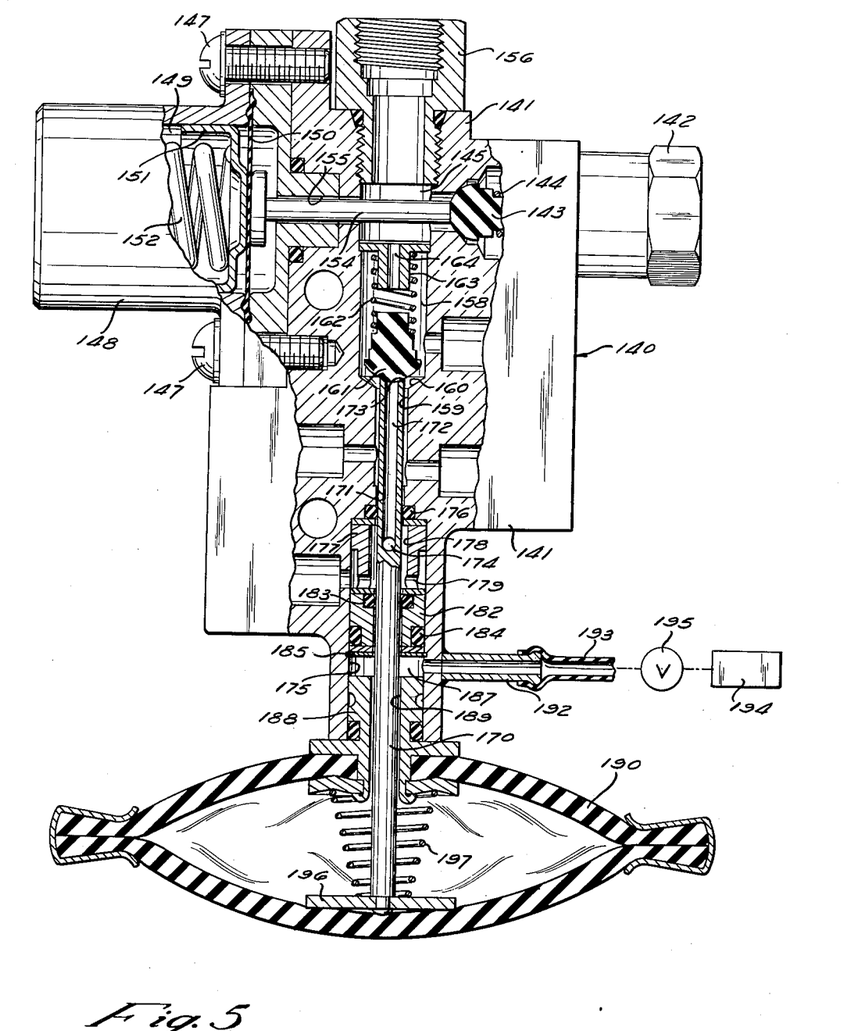
FIG. 5 is a cross-sectional view of the unit shown in FIG. 4 shifted to the high clearance position.
Figure 6:
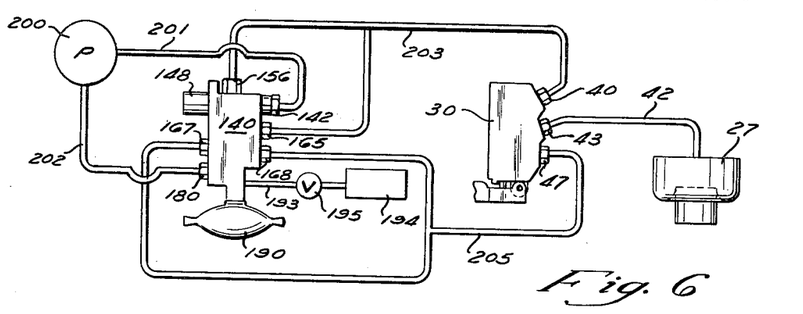
FIG. 6 is a schematic view of a fluid pressure system utilizing the control valve shown in FIGS. 4 and 5 with the level valve shown in FIGS. 2 and 3.

An alternative control system for the level control valve is shown in FIGS. 4, 5 and 6. The control and selector valve indicated at 140 is shown in detail in FIGS. 4 and 5 and includes a valve housing 141. An inlet fitting 142 is provided on housing 141 adjacent the upper end for connection to the high pressure outlet of the pump. A valve poppet 143 is mounted within inlet fitting 142 and is biased by a compression spring 144 in engagement with a valve seat on the valve body to control fluid flow between inlet fitting 142 and a chamber 145 within the valve housing. On the other side of the valve housing 141 from inlet fitting 142 there is mounted a two piece pressure regulator housing 148 secured to the housing by screws 147. A cylindrical chamber 149 within the pressure regulator housing 148 is blocked off at its inner end by a diaphragm 150. A piston 151 is fitted within cylindrical chamber 149 to contact diaphragm 150. Outwardly of piston 151, a compression spring 152 is mounted to bias the piston 151 inwardly, and the other end of spring 152 abuts against a screw plug 153 screwed in the outer end of chamber 149. A rod 154 is secured to piston 151 and diaphragm 150 to extend inwardly through bore 155 in the valve housing and across chamber 145 to contact the valve poppet 143.

It will be seen that the aforedescribed assembly serves as a pressure regulator to control the fluid pressure within chamber 145. Rod 154 is made a loose fit within bore 155 to allow fluid pressure to enter cylindrical chamber 149 on the inner side of diaphragm 150. When the pressure within chamber 145 and hence on the inner side of diaphragm 150 is below an amount determined by the compression applied to spring 152 by screw plug 153, the spring force moves the rod 154 to raise valve poppet 143 off its seat and allow pressurized air to flow into chamber 145 through the inlet fitting 142. When the fluid pressure within chamber 145 balances the force applied to piston 151 and diaphragm 150 by compression spring 152, this pressure will move these parts outwardly to withdraw rod 154 from contact with valve poppet 143, after which the poppet seats under the action of the valve spring 144 to prevent further admission of fluid into chamber 145 until the pressure therein drops to a level where the biasing force of spring 152 is able to reopen the poppet valve.

Directly below chamber 145 along the vertical axis of valve housing 141 is a lower cylindrical chamber 158. Extending downwardly from chamber 158 is a reduced cylindrical bore 159, and a suitable valve seat 160 is located on the valve housing at the junction of chamber 158 and bore 159. A valve poppet 161 is positioned within the chamber 158 to seat against valve seat 160 under the action of a compression spring 162. The upper end of spring 162 seats against a plug 163 secured in the valve housing between chamber 145 and chamber 158 by a suitable snap ring or other fastening means. Plug 163 is provided with a bore 164 to provide a fluid connection between the chambers 145 and 158. An outlet port fitting 156 is located at the upper end of chamber 145, and another outlet port 165 is formed in the valve body housing to connect with lower chamber 158 above check valve poppet 161. Thus both outlet ports 156 and 165 provide an output of fluid regulated as to pressure regardless of the input pressure at the inlet fitting 142.

A pair of return ports 167 and 168 are formed in the valve housing 141 on opposite sides thereof and connect with bore 159. A valve rod 170 is journaled within a reduced bore 171 in the valve housing for vertical sliding movement, and its upper end extends into bore 159. A bore or passage 172 extends axially downward through the upper end of a valve rod 170 from a valve seat 173 formed around the bore at the upper end of the valve rod. The lower end of bore 172 connects with a transverse port 174 which serves to connect bore 172 to the exterior surface of the valve rod 170.

Directly below bore portion 171, the valve housing 141 has an enlarged bore or chamber 175 surrounding the valve rod 170, and this enlarged bore 175 is sealed off at its upper end from bore 171 and bore 159 by a suitable O-ring seal 176. A suitable spacer 177 is fitted within the upper end of enlarged bore 175 and is provided with an enlarged axial chamber 178 surrounding the valve rod 170 adjacent transverse port 174. By virtue of suitable ports 179, chamber 178 is connected to an exhaust port 180 formed within the valve housing 141 below return port 167. A spacer plug 182 closes off enlarged bore 175 below chamber 178 and is held in place by a suitable snap ring 185. O-ring seals 183 and 184 provide a fluid tight seal to prevent escape of fluid pressure from between the spacer plug 182 and the valve housing 141 and the valve rod 170.

A closure plug 188 is fitted in the lower end of enlarged bore 175 and spaced away from spacer plug 182 by a chamber 187. Plug 188 is provided with an enlarged axial bore 189 to loosely receive the valve rod 170, which extends through bore 189 into the chamber within an actuator bellows 190. The actuator bellows may be of any type suitable for a vacuum actuator, and are shown to be of the construction shown in a co-pending application of Ralph T. Marette, Serial No. 829,718, filed July 27, 1959 and assigned to the assignee of the present invention.

The vacuum connection to the interior of actuator bellows 190 is provided by a vacuum port 192 opening into chamber 187. Port 192 is connected through vacuum line 193 and vacuum control valve 195 to a suitable vacuum source indicated at 194. This vacuum source is preferably the manifold vacuum of the internal combustion engine of the vehicle with which the suspension is employed, or alternatively may be any other vacuum source capable of operating the actuator bellows 190. It will be seen that when the vacuum source is connected through vacuum port 192, the air within the actuator bellows 190 will be evacuated, thereby causing the external atmospheric pressure to collapse the bellows. The force thereby exerted by the collapsing bellows on plate 196 on the end of rod 170 will cause the valve rod to be shifted to an upward position. Conversely, when atmospheric air is allowed to enter the interior of actuator bellows 190, the force of coil spring 197 within the bellows and surrounding the valve rod 170 will act upon plate 196 and thereby shift the valve rod 170 to a downward position.

The operation of the control valve 140 will be seen more clearly in conjunction with FIG. 6 which shows a suspension system employing the control valve connected to the leveling valve shown in FIGS. 2 and 3. Fluid pressure is supplied from a suitable pump indicated at 200 through a high pressure line 201 to the inlet fitting 142 on the control valve 140. An exhaust or return line 202 extends from the exhaust port 180 on the control valve back to the inlet side of pump 200 to provide a closed system for recirculation of the fluid. A pressure line 203 extends from control valve 140 to the inlet fitting 40 on the leveling valve 30, and leveling valve 30 is connected by line 42 to air spring 27 in the manner previously described in conjunction with FIG. 1. A return line 205 extends from return line fitting 47 on the leveling valve 30 back to the control valve 140. As shown, pressure line 203 is connected to both ports 156 and 165, while return line 205 is connected to the two return ports 167 and 168, however it is to be understood that the reason for providing both sets of ports on the control valve is that one set may be connected to the front wheel suspension while the other set connected to the rear wheel suspension.

The clearance height of the vehicle will be regulated simply by the operation of the vacuum control valve 195. When the vacuum is disconnected, so that the interior of actuator bellows 190 is at atmospheric pressure, the control valve will assume the position shown in FIG. 4. Valve rod 170 is shifted to its downward position, so that valve poppet 161 seats against valve esat 160 under the action of spring 162 and the pressure within chambers 158 and 145. This allows the return line to be connected through ports 167 and 168 to bore 159, and from there through bore 172 through valve rod 170, transverse port 174, port 179 to exhaust 180. Since the return line operates at low pressure, the valve capsule within the level control valve is shifted to the upper position as shown in FIG. 2.

When vacuum control valve 195 is operated to permit the vacuum source 194 to withdraw the air from within actuator bellows 190, the resulting collapse of the actuator bellows lifts the valve rod 170 to its upper position as shown in FIG. 5. It will be seen that as the valve rod moves upward it contacts the lower side of valve poppet 161 and lifts it off valve seat 160. At the same time, the poppet 161 under the force of spring 162 is seated on valve seat 173 on the valve rod to seal off bore 172. In this position, the return line is connected through return ports 167 and 168 to the bore 159 which is now connected to chambers 158 and 145 through the open check valve poppet 161. Likewise, the action of check valve poppet 161 seating on valve seat 173 seals off exhaust port 180 through the intervening passages from the return ports 167 and 168. The pressurized fluid within chambers 145 and 158 now passes downward through bore 159 and out through the return ports 167 and 168 to pressurize the return line and shift the valve capsule within the level valve to the lower position as shown in FIG. 3 to thereby raise the vehicle height in the aforedescribed manner.

Figure 7:
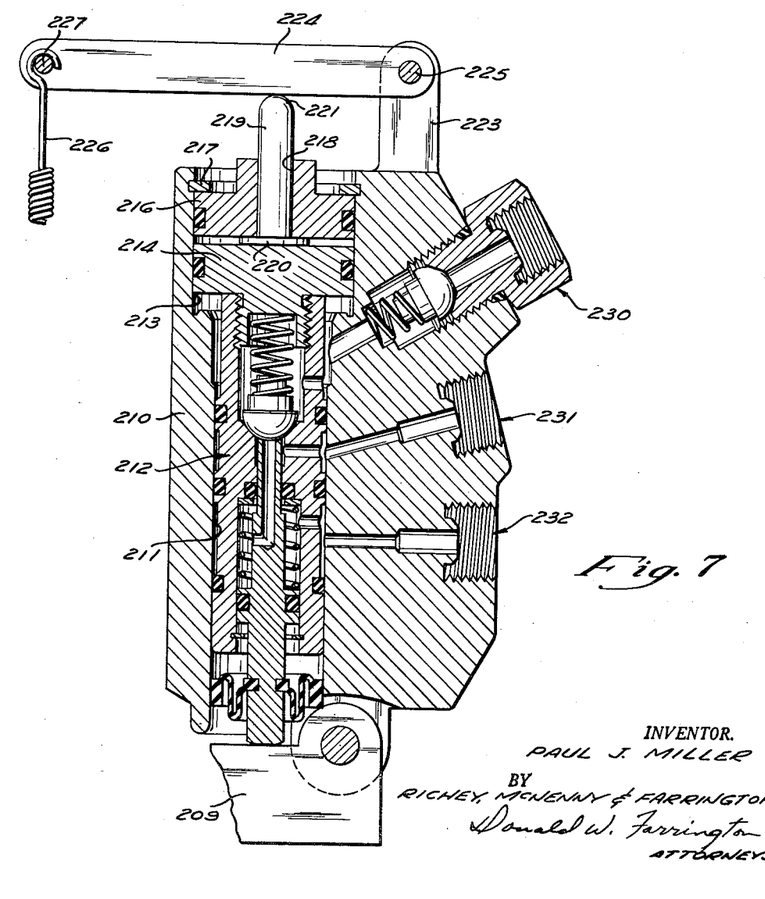
FIG. 7 is a cross-sectional view of another embodiment of the level valve showing means for shifting the valve capsule by a mechanical linkage.

Another embodiment of the leveling valve is shown in FIG. 7. As shown therein, the leveling valve has a housing 210 through which extends a vertical bore 211 to receive a valve capsule 212. Valve capsule 212 in itself is of the same construction as valve capsule 66 of the embodiment shown in FIG. 2 and 3. Accordingly, valve capsule 212 has an enlarged piston 214 on its upper end to fit within an enlarged counterbore 213 on the upper end of bore 211. At its upper end, counterbore 213 is closed off by plug 216 held in place by snap ring 217. A bore 218 extends axially through plug 216 to slidably journal a plunger 219. The inner end of plunger 219 has an enlarged head portion 220 which abuts against the upper side of piston 214, and also prevents withdrawal of plunger 219 out of bore 218. At its outer end plunger 219 has a tip portion 221 for engagement with an actuating lever 224. Lever 224 at its one end is pivoted on a pivot pin 225 connected to an upstanding lug 223 on the valve housing. At its other end, lever 224 is provided with a pin 227 to which a control wire or cable indicated at 226 is attached.

Valve capsule 212 is actuated by operating arm 209 in the same manner as in the previously described embodiment, and pressurized fluid enters the valve housing through inlet fitting 230 in the same manner as through inlet fitting 40 in the previously described embodiment. The valve housing 210 is also provided with an outlet fitting 231 connected to the suspension unit and an exhaust port 232 located in the same position on the valve housing as was return line port 47 in the embodiment of FIGS. 2 and 3. No other exhaust port is provided, and the exhaust from the suspension unit will pass outward through exhaust port 232 either to the atmosphere or to a return line regardless of the position of valve capsule 212 within bore 211.

It will be seen that the pressure of the inlet air entering the valve housing through inlet fitting 230 exerts a force on the underside of piston 214 to normally bias piston 214 and the attached valve capsule 212 to an upper position where piston 214 abuts against head 220 on plunger 219 and hence against plug 216. The position corresponds to the normal position of the leveling valve in which the suspension unit operates at normal vehicle clearance heights. When the operator of the vehicle desires to increase the clearance height, he operates an appropriate control mechanism to exert a pull upon control cable 226. Movement of control cable 226 causes lever 224 to pivot about its pivot pin 225 and force plunger 219 downward. As the plunger moves downward, head 220 acts upon piston 214 to force the valve capsule 212 downward, and by the shift in position of valve capsule 212 relative to operating arm 209, the operating clearance height of the vehicle will be increased in the same manner as previously described hereinabove. However, it will be seen that in this embodiment of the leveling valve, depending upon the positioning mechanism for control cable 226, the valve capsule 212 may be positioned at any point between the normal and the highest position, since the air pressure on the bottom side of piston 214 will hold the piston in contact with the plunger 219 which in turn is positioned by contact with lever 224. Thus the vehicle operator can choose any reference clearance height between the normal and the highest position, and may accordingly select any increase in clearance height desired without being required to raise the vehicle to the maximum extent.

Figures 8, 9:
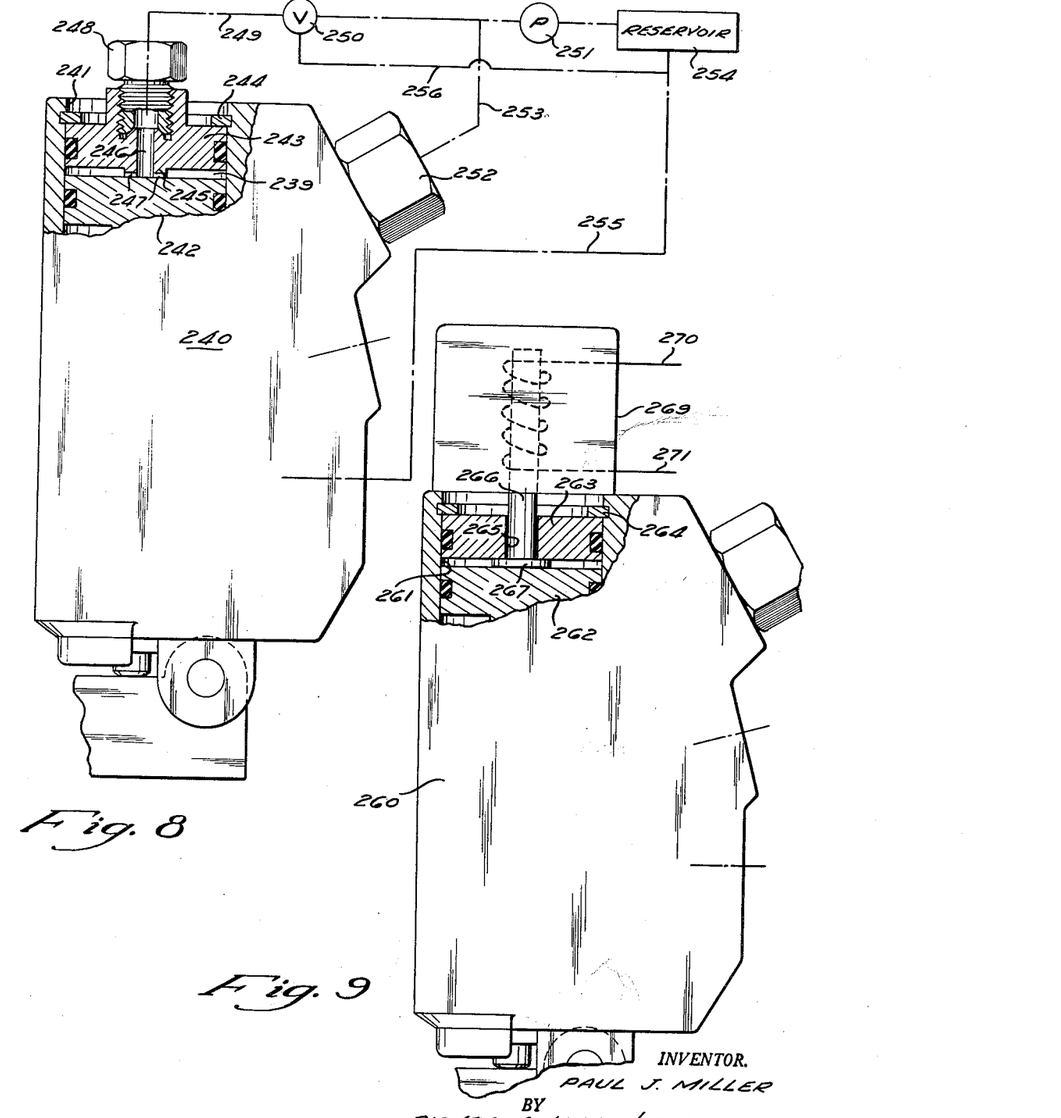
FIG. 8 is a diagrammatic view of another embodiment of the invention showing means for shifting the valve capsule utilizing fluid pressure.
FIG. 9 is a diagrammatic view of still another embodiment of the invention showing means for shifting the valve capsule by an electric solenoid.

Another method of shifting the valve capsule to vary the operating clearance heighth of the vehicle is shown in FIG. 8. The valve housing 240 is constructed similarly to the housing 210 of the embodiment shown in FIG. 7, and at the upper end, counterbore 241 receives a piston head 242 which is connected to a valve capsule as previously described. Above piston 242, a plug 243 is held within counterbore 241 by a snap ring 244. The inner side of plug 243 adjacent piston 242 is provided with a raised boss 245 to insure a spaced chamber between plug 243 and piston 242. This chamber 239 is connected by transverse ports 247 on boss 245 to an axial bore 246 which extends upward through plug 243 where it connects to a fluid fitting 248 suitably secured in plug 243.

As shown schematically, a fluid pressure line 249 extends from fluid fitting 248 through a two position selector valve 250 to the fluid pump 251. Pump 251 is also connected through an inlet line 253 to an inlet fitting 252 on the valve housing 240 to supply fluid pressure to the control valve. An exhaust or return line 255 may also be provided to connect the exhaust from the leveling valve back to a fluid reservoir indicated at 254. Another line 256 connects the selector valve 250 to reservoir 254 to permit pressurized fluid to be drained from chamber 239.

It will be seen that the fluid system described schematically above provides a closed system in which the fluid exhausted from the suspension unit is returned through line 255 to the reservoir. To vary the position of piston 242 and hence the valve capsule attached thereto and thereby change the reference clearance height of the vehicle, all that is necessary is to open or close selector valve 250. With selector valve 250 closed, chamber 239 will be connected through fluid fitting 248, valve 250 and line 256 to the reservoir so that the pressure exerted on the underside of piston 242 by the supply pressure at inlet fitting 252 forces the piston upward to the position shown in FIG. 8 in abutting contact with boss 245. When selector valve 250 is turned to admit fluid pressure from the pump 251 into chamber 239, the larger area on the upper surface of piston 242 will result in a net downward force on the piston and the piston 242, and the attached valve capsule will be shifted to the lower position so that the reference clearance height of the vehicle will be increased. It will therefore be seen that this embodiment shifts the valve capsule by air pressure in a manner similar to that of the embodiment shown in FIGS. 2 and 3, however the air pressure is applied directly to the piston through control line 249 and fluid fitting 248 rather than through the return line, so that the return line may serve as the exhaust from the suspension unit at all times and allow the system to be closed in both positions.

Still another method of shifting the valve capsule is shown diagrammatically in FIG. 9. As shown therein, the leveling valve housing 260 is constructed the same as the valve housing of embodiment of FIG. 8, and is provided at its upper end with a counterbore 261 to receive a piston 262 connected to the valve capsule in the same manner as previously described. A plug 263 is held in the upper end of counterbore 261 above piston 262 by a snap ring 264. Plug 263 is provided with an axially extending bore 265 to slidably journal a plunger 266 therein. At its lower end, plunger 266 is provided with an enlarged head portion 267 to abut against the upper side of piston 262, and also to prevent withdrawal of plunger 266 upwards through the bore 265. A solenoid housing 269 is secured on the upper side of valve housing 260 above the counterbore 261 and contains a solenoid operatively connected to plunger 266. The solenoid within housing 269 may be energized from a suitable electric source on the vehicle through the wires indicated at 270 and 271. It will readily be seen that by energizing the solenoid, the plunger 266 can be moved downward to move the piston 262 and its associated valve capsule downward to the lower position to increase the clearance height of the vehicle in the manner previously described.

Figure 10:
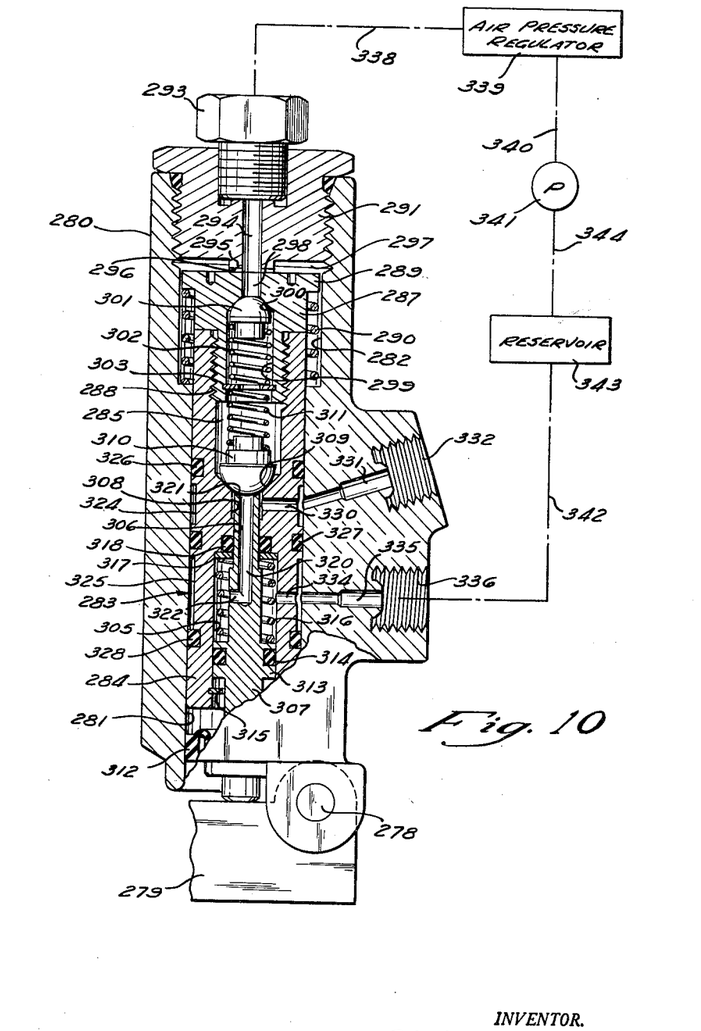
FIG. 10 is a cross-sectional view of another embodiment of the level control valve in which the valve capsule is shifted by changes in the operating system fluid pressure.

An alternative construction of the leveling valve is shown in FIG. 10. The valve shown therein has a housing 280, and an operating arm 279 is pivotally connected at 278 on the lower end of housing 280 for actuation of the valve mechanism inside of housing 280. The valve housing 280 has an axially extending bore 281 therein, and at its upper end, bore 281 connects with an enlarged counterbore 282. A valve capsule 283 is slidably mounted within bores 281 and 282 and includes a valve body 284 having a cylindrical outer surface which is slidably journaled in bore 281. An axially extending chamber 285 is formed within the upper end of valve body 284 and is closed off at its upper end by a plug 287 having a threaded shank 288 which is received in the upper end of chamber 285. Plug 287 has a radially extending flange 289 around its upper periphery, so that flange 289 acts as the upper abutment for a helical compression spring 290. Spring 290 abuts at its lower end on the bottom of the counterbore 282 and surrounds the valve body 284 and plug 287.

The upper end of counterbore 282 is closed off by means of a threaded plug 291. An inlet fitting 293 is secured in threaded plug 291 to connect with a bore 294 extending axially through the plug 291 to terminate in a raised boss 295 in the lower side of the plug. Boss 295 spaces the upper end of plug 287 away from the lower side of plug 291 to provide a chamber 297 which is connected to bore 294 through transverse ports 296 on the end of boss 295.

A bore 298 extends axially through plug 287 in alignment with the bore 294 in the threaded plug 291, and connects with an enlarged bore 299 extending through the threaded shank 288 on plug 287. A valve seat 300 is formed between the bores 298 and 299 to receive a valve poppet 301. Poppet 301 is urged into contact with valve seat 300 by a spring 302 which abuts at its lower end on a snap ring 303 secured in the lower end of enlarged bore 299.

The lower end of valve body 284 is provided with an axially extending bore or chamber 305. Bore 305 extends upward to join a reduced bore 306 in which a valve rod 307 is slidably journaled. Above reduced bore 306, valve rod 307 extends into a slightly enlarged bore 308 which opens into the chamber 285 at the upper end of the valve body. A valve seat 309 is formed on the valve body adjacent the enlarged bore 308 within chamber 285 to receive a valve poppet 310. A compression spring 311 biases poppet 310 into contact with valve seat 309, and at its upper end spring 311 seats against the snap ring 303 in plug 287.

Valve rod 307 at its lower end passes through a dust seal 312 extending across bore 281 in housing 280 to rest against the upper side of operating arm 279. Adjacent its midpoint, valve rod 307 is provided with a land portion having an O-ring seal 314 to make a sliding fit within bore 305. A snap ring 315 is located in the bottom end of bore 305 to prevent movement of valve rod 307 and land portion 313 out of the bore. A coil compression spring 316 fits around valve rod 307 within bore 305 and abuts at its lower end against land portion 313 and at its upper end against a washer 317 which holds an O-ring seal 318 in place at the upper end of bore 305 surrounding the valve rod 307. The valve rod 307 is provided with an axially extending bore 320 in its upper end portion. Bore 320 at the upper end of the valve rod opens into a valve seat 321 adapted to make contact with the valve poppet 310. At the lower end, bore 320 opens through a transverse port 322 into the chamber 305 above the land portion 313.

The outer periphery of the valve body 284 is provided with a pair of circumferential upper and lower grooves 324 and 325, respectively. These grooves are sealed off from each other and from the ends of the valve body by means of O-rings 326, 327 and 328. A port 330 extends through the valve body 284 from the enlarged bore portion 308 radially outwardly to open into the upper groove 324. The valve housing 280 is provided with a passage 331 which communicates with bore 281 adjacent the upper groove 324 and extends outwardly to form a port 332 for connection to the fluid suspension unit. The valve body 284 is also provided with a second port 334 opening at its inner end into the chamber 305 above the land portion 313 on valve rod 307. Passage 334 extends radially outward and opens into the lower groove 325. A passage 335 is located within the valve housing 280 and extends radially inward to open onto the bore 281 adjacent the lower groove 325. At its outer end, passage 335 opens into a return port 336.

As shown schematically in FIG. 10, the inlet fitting 293 on threaded plug 291 is connected through a pressure line 338 to a variable pressure regulator indicated at 339. The pressure regulator 339 is in turn connected through a pressure line 340 to the outlet side of the pump 341. The port 332 is connected through suitable connecting lines (not shown) to the wheel suspension unit. The return port 336 is connected through the return line 342 through the storage reservoir 343 which in turn is connected through a line 344 to the inlet side of pump 341.

The inlet air enters through fitting 293 and then through bores 294 and 298 through the upper check valve poppet 301 to provide the fluid pressure from the pressure regulator 339 within chamber 285 in the valve body. It will be seen that if the vehicle height becomes too low, the movement of the operating arm 279 will raise the valve rod 307 and raise the valve poppet 210 off the valve seat 309. This admits the fluid pressure from chamber 285 into bore 308 and hence through passage 331 to the outlet port and the wheel suspension unit. On the other hand, when the valve rod 307 is lowered when the vehicle height becomes excessive, the valve seat 321 on the upper end of valve rod 307 will be moved downward from its sealing contact with the check valve poppet 310 to allow the fluid within the spring to exhaust through the port 332, passage 331 and bore 308 downward through the bore 320 within the valve rod, and out through transverse port 322 into the chamber 305. From here, the fluid passes outward through the passage 335 and the return port 336. From the above describtion, it will be seen that the valve assembly within valve body 284 operates to provide a leveling action depending upon the movement of the valve rod 307 in the same manner as in the previously described embodiment.

It will be seen that by virtue of the connection through the transverse ports 296 on the boss 295, that the chamber 297 and all of counterbore 282 will be at the same pressure as determined by the pressure regulator 339. This fluid pressure acts as a net force on the upper side of plug 287 tending to urge the plug 287 and valve body 284 downward to move the valve capsule into the lower position to raise the vehicle clearance height. This force of the fluid pressure is opposed by the force of compression spring 290, so that the position of the valve capsule 283 will be determined by the equilibrium of force between the force exerted by the fluid pressure in chamber 297 and the force of compression spring 290. Since to increase the compression of spring 290 by moving the valve capsule downward requires greater force, an increase in the pressure within 297 by changing the setting the pressure regulator 339 will cause the valve capsule to assume a different and lower position within the control valve housing 289. In this embodiment, an increase in the line pressure by adjustment of pressure regulator 339 not only results in greater operating pressure for the leveling valve and hence greater pressure in the suspension unit, but also causes a shift in the position of the valve capsule to increase the clearance height of the vehicle. Thus as clearance height is increased, the greater pressure within the suspension unit in the case of an air spring results in a higher spring rate and hence stiffer spring action.

It will be seen that according to the amount of precompression applied to the spring 290, a certain minimum pressure must be reached in chamber 297 before the valve capsule will start to move downwards, and likewise, depending upon the spring constant of spring 290, the upper pressure level at which the valve capsule reaches the lower limit of travel may also be varied. By proper selection of the specification for the spring constant of spring 290 and the amount of its precompression, it will be seen that the pressure level at which the valve capsule starts to move and the amount of pressure increase required to shift the valve capsule to the lowermost position can be selected as desired. For example, spring 290 may be selected so that the valve capsule will not start to move downward until the air pressure exceeds 130 p.s.i. and likewise when the pressure reaches 160 p.s.i. the valve capsule may have reached the lower limit. Thus the suspension unit may be designed for a normal operating pressure of 130 p.s.i., and as the pressure is increased through adjustment of pressure regulator 339, the valve capsule will move downward causing the vehicle height to increase and the operating pressure within the air spring to increase, until at a pressure of 160 p.s.i., the vehicle will be raised to the maximum clearance height and the spring pressure will be around 160 p.s.i. or slightly less. Depending upon the setting of pressure regulator 339, the valve capsule may be positioned at any point in between the low and high positions, and the leveling action provided by the movement of the valve rod and the valve poppet within the valve capsule will at all times provide a leveling action about the reference point determined by the position of the valve capsule.

Although the invention has been shown and described in conjunction with an air suspension system, it is understood that the leveling valve may also be used with combination gas and liquid suspension systems in which a liquid is metered into and out of spring units containing both a liquid and a gas. Furthermore, the invention is not limited to vehicle suspension systems and may be used in other applications such as for positioning moving platforms used for guided missiles and various types of machinery.

Although several embodiments and modifications of the invention have been shown and described in detail, it is understood that the invention is not limited to the structures shown, and that various modifications and rearrangements may be made by those skilled in the art without departing from the scope of the invention as defined in the following claims.

What is claimed is:

1. A control valve to provide multiple positioning of an expansible fluid chamber comprising a housing, actuating means operatively connected to said housing, a bore through said housing, an enlarged counterbore at one end of said bore, a valve capsule slidably mounted in said bore for movement to and from said actuating means, said valve capsule having a piston portion slidable in said counterbore, a plug in the end of said counterbore to form a chamber between said plug and said piston, a plurality of fluid ports on said housing opening into said bore at spaced points along the axis, valve means within said valve capsule, said valve means including a member operatively engaging said actuating means, ports in said capsule to interconnect said housing ports and said valve means, a source of fluid pressure, and means to admit fluid pressure into said chamber to shift said piston and said valve capsule away from said plug.

2. A control valve to provide multiple positioning of an expansible fluid chamber comprising a housing, actuating means operatively connected to said housing, a bore through said housing, an enlarged counterbore at one end of said bore, a valve capsule slidably mounted in said bore for movement to and from said actuating means, said valve capsule having a piston portion slidable in said counterbore, a plug in the end of said counterbore spaced away from said piston, a plurality of fluid ports on said housing opening into said bore at spaced points along the axis, valve means within said valve capsule, said valve means including a member operatively engaging said actuating means, ports in said capsule to interconnect said housing ports and said valve means, a bore in said plug, a plunger slidably journaled in said plug bore, and mechanical linkage means adapted to shift said plunger to shift said piston and said valve capsule away from said plug.

3. A control valve to provide multiple positioning of an expansible fluid chamber comprising a housing, actuating means operatively connected to said housing, a bore through said housing, an enlarged counterbore at one end of said bore, a valve capsule slidably mounted in said bore for movement to and from said actuating means, said valve capsule having a piston portion slidable in said counterbore, a plug in the end of said counterbore spaced away from said piston, a plurality of fluid ports on said housing opening into said bore at spaced points along the axis, valve means within said valve capsule, said valve means including a member operatively engaging said actuating means, ports in said capsule to interconnect said housing ports and said valve means, a bore in said plug, a plunger slidably journaled in said plug bore, and electric solenoid means adapted to shift said plunger to shift said valve capsule away from said plug.

4. In a vehicle having a frame, a wheel, and a fluid suspension unit interconnecting said wheel and said frame, a control valve to regulate the spacing between said wheel and said frame, said control valve including a housing secured to said frame, a source of fluid pressure connected to said housing, first conduit means connecting said housing to said fluid suspension unit, second conduit means adapted to connect said housing to the inlet side of said fluid pressure source, an exhaust port on said housing, a bore extending through said housing, a valve capsule shiftably mounted in said bore, valving means within said valve capsule to control fluid admission to and exhaust from said fluid suspension unit, port means interconnecting said valving means and said first and second conduit means, linkage means interconnecting said housing and said wheel to operate said valving means responsive to relative movement between said wheel and said frame, valve means to disconnect said second conduit means from the inlet of said fluid pressure source and reconnect said second conduit means to the outlet of said fluid pressure source, and means responsive to fluid pressure in said second conduit means to shift said valve capsule and said valving means within said housing and toward said linkage.

5. In a vehicle having a frame, a wheel, and a fluid suspension unit interconnecting said wheel and said frame, a control valve to regulate the spacing between said wheel and said frame, said control valve including a housing secured to said frame, a source of fluid pressure connected to said housing, first conduit means connecting said housing to said fluid suspension unit, second conduit means adapted to connect said housing to the inlet side of said fluid pressure source, an exhaust port on said housing, a bore extending through said housing, a valve capsule shiftably mounted in said bore, a counterbore in said housing coaxial with said bore, a piston on said valve capsule in said counterbore, plug means closing off the end of said counterbore to form a chamber between said plug means and said piston, valving means within said valve capsule to control fluid admission to and exhaust from said fluid suspension unit, port means interconnecting said valving means and said first and second conduit means, linkage means interconnecting said housing and said wheel to operate said valving means responsive to relative movement between said wheel and said frame, valve means to disconnect said second conduit means from the inlet of said fluid pressure source and reconnect said second conduit means to the outlet of said fluid pressure source, and means to admit fluid pressure from said second conduit means into said chamber to shift said valve capsule and said valving means within said housing and toward said linkage.

6. A control valve to provide multiple position of an expansible fluid chamber comprising a housing, actuating means operatively connected to said housing, a bore through said housing, a valve capsule slidably mounted in said bore for shiftable movement to and from said actuating means, a first chamber in said valve capsule, port means adapted to connect said first chamber to a fluid pressure source, a second chamber in said valve capsule, port means adapted to exhaust fluid from said second chamber, a third chamber in said valve capsule intermediate said first and second chambers, port means adapted to interconnect said third chamber and said expansible fluid chamber, a valve seat in said capsule between said first chamber and said third chamber, a valve rod slidably journaled in said capsule for movement to and from said actuating means, a longitudinal bore in said valve rod, said valve rod bore and said valve rod terminating at one end adjacent said valve seat, said rod bore opening at the other end into said second chamber, a valve seat on said valve rod adjacent said one end of said valve rod bore and first mentioned valve seat, and a poppet in said first chamber adapted to make sealing contact with both of said valve seats.

7. A control valve to provide multiple positioning of an expansible fluid chamber comprising a housing, actuating means operatively connected to said housing, a bore through said housing, a valve capsule sildably mounted in said bore for shiftable movement to and from said actuating means, an inlet port on said housing opening into said bore, an outlet port on said housing opening into said bore a spaced distance from said inlet port, a third port on said housing opening into said bore and spaced from said other housing ports, a first chamber in said valve capsule, a first port in said capsule adapted to interconnect said first chamber and said inlet port, a second chamber in said valve capsule, a second port in said capsule adapted to interconnect said second chamber and said third housing port, a third chamber in said valve capsule intermediate said first and second chambers, a third port in said capsule adapted to interconnect said third chamber and said outlet port, a valve seat in said capsule between said first chamber and said third chamber, a valve rod slidably journaled in said capsule for movement to and from said actuating means, a longitudinal bore in said valve rod, said valve rod bore and said valve rod terminating at one end adjacent said valve seat, said valve rod bore opening at the other end into said second chamber, a valve seat on said valve rod adjacent said one end of said valve rod bore and said first mentioned valve seat, and a poppet in said first chamber adapted to make sealing contact with both of said valve seats.

8. In a vehicle having a frame, a wheel, a fluid suspension unit interconnecting said wheel and said frame, a source of fluid pressure, and a control valve to regulate the spacing between said wheel and said frame, said control valve including a housing secured to said frame, first conduit means connecting said fluid pressure source to said housing, second conduit means connecting said housing to said fluid suspension unit, a first exhaust port on said housing, a second exhaust port on said housing, a bore extending through said housing, a valve capsule shiftably mounted in said bore for movement between first and second positions, an operating arm mounted on said housing and extending adjacent one end of said bore to interconnect said housing and said wheel, valving means within said valve capsule, port means interconnecting said valving means with said first and second conduit means, said valving means including a shiftable valve rod operatively engaging said operating arm, said valving means being operable in one position of said valve rod to interconnect said first conduit means and said second conduit means to admit fluid pressure into said fluid suspension unit, said valving means being operable in a second position of said valve rod to interconnect said second conduit means and one of said exhaust ports to exhaust fluid pressure from said fluid suspension unit, and means to shift said valve capsule and said valve rod between said first and second positions with respect to said housing and said operating arm to change the spacing between said frame and said wheel.

9. A control valve to provide multiple positioning of an expansible fluid chamber comprising a housing, actuating means operatively connected to said housing, a bore through said housing, an enlarged counterbore at one end of said bore, a valve capsule slidably mounted in said bore for movement to and from said actuating means, said valve capsule having a piston portion slidable in said counterbore, plug means in the end of said counterbore to form a motor chamber between said plug means and said piston portion, valving means within said valve capsule, port means connecting said valving means to said expansible fluid chamber and to exhaust, inlet port means connecting said motor chamber to a fluid pressure source, means biasing said valve capsule and said piston portion towards said plug means, and connecting port means connecting said motor chamber to said valving means.

10. In a vehicle having a frame, a wheel, and a fluid suspension unit interconnecting said wheel and said frame, a control valve to regulate the spacing between said wheel and said frame, said control valve including a housing secured to said frame, an operating arm mounted on said housing, a bore through said housing, an enlarged counterbore at one end of said bore, a valve capsule slidably mounted in said bore for movement to and from said operating arm, said valve capsule having a piston portion slidable in said counterbore, a plug in the end of said counterbore to form a chamber between said plug and said piston portion, valving means within said valve capsule adapted to admit fluid to and exhaust fluid from said fluid suspension unit, port means connecting said valving means to said fluid suspension unit and to exhaust, a source of fluid pressure, a variable fluid pressure regulator connected to said fluid pressure source, inlet port means connecting said chamber to said fluid pressure regulator, spring means biasing said valve capsule and said piston toward said plug against the force of fluid pressure in said chamber, and connecting port means connecting said chamber to said valving means.

11. In a vehicle having a frame, a wheel, and a fluid suspension unit interconnecting said wheel and said frame, a control valve to regulate the spacing between said wheel and said frame, said control valve including a housing secured to said frame, an operating arm mounted on said housing, a bore through said housing, an enlarged counterbore at one end of said bore, a valve capsule slidably mounted in said bore for movement to and from said operating arm, said valve capsule having a piston portion slidable in said counterbore, a plug in the end of said counterbore to form a chamber between said plug and said piston portion, spring means biasing said valve capsule and said piston portion toward said plug, a source of variable fluid pressure, first conduit means connecting said variable fluid pressure source to said chamber, second conduit means connecting said housing to said fluid suspension unit, an exhaust port on said housing, valving means within said valve capsule, a connecting port interconnecting said valving means and said chamber, port means interconnecting said valving means with said second conduit means and said exhaust port, said valving means including a shiftable valve rod operatively engaging said operating arm, said valving means being operable in one position of said valve rod to interconnect said chamber and said second conduit means to admit fluid pressure into said fluid suspension unit, said valve means being operable in a second position of said valve rod to interconnect said second conduit means and exhaust port to exhaust fluid pressure from said fluid suspension unit, variations of the fluid pressure within said chamber shifting said valve capsule and said valve rod with respect to said housing and said operating arm against the force of said spring means to change the spacing between said frame and said wheel.

12. A control valve comprising a housing, a bore in said housing, a valve capsule mounted in said bore for axially slidable movement, a plurality of fluid ports on said housing opening into said bore, at least two fluid chambers in said valve capsule, port means in said capsule connecting each fluid chamber with one of said housing ports, valving means within said valve capsule, said valving means including a valve seat between said fluid chambers and a poppet adapted to make sealing engagement with said valve seat, said valving means also including means to shift said poppet away from said valve seat, and means to shift said valve capsule between at least two axially spaced positions in said bore.

13. In a vehicle having a frame member, a wheel supporting member and a fluid suspension unit interconnecting said members, a control valve to regulate the spacing between said members, said control valve including a housing secured to one of said members, a source of fluid pressure connected to said housing, conduit means connecting said housing to said fluid suspension unit, a bore in said housing, a valve capsule mounted in said bore for axially slidable movement, at least two fluid chambers in said valve capsule, first port means connecting one of said fluid chambers to said fluid pressure source, second port means connecting another of said fluid chambers to said conduit means, valving means within said valve capsule, said valving means including a valve seat between said fluid chambers and a poppet adapted to make sealing engagement with said valve seat, said valving means also including actuating means to shift said poppet away from said valve seat, means to shift said valve capsule between at least two axially spaced positions in said bore, and linkage means interconnecting said housing and the other of said members and operably engaging said actuating means to operate said valving means responsive to movement between said members.

14. In a vehicle having a frame member, a wheel supporting member and a fluid suspension unit interconnecting said members, a control valve to regulate the spacing between said members, said control valve including a housing secured to one of said members, a source of fluid pressure, first conduit means connecting said fluid pressure source to said housing, second conduit means connecting said housing to said fluid suspension unit, a bore in said housing, a valve capsule mounted in said bore for axially sliding movement, an operating arm mounted on said housing and extending adjacent one end of said bore to interconnect said housing and the other of said members, at least two fluid chambers in said valve capsule, first port means connecting one of said fluid chambers to said first conduit means, second port means connecting another of said fluid chambers to said second conduit means, valving means within said valve capsule, said valving means including a valve seat between said fluid chambers and a poppet adapted to make sealing engagement with said valve seat, said valving means also including a shiftable valve rod operatively engaging said operating arm, said valve rod being operable by movement of said operating arm to shift said poppet away from said valve seat to allow fluid flow between said chambers to connect said fluid pressure source with said fluid suspension unit, and means to shift said valve capsule between at least two axially spaced positions in said bore.

15. In a vehicle having a frame member, a wheel supporting member and a fluid suspension unit interconnecting said members, a control valve to regulate the spacing between said members, said control valve including a housing secured to one of said members, a source of fluid pressure, first conduit means connecting said fluid pressure source to said housing, second conduit means connecting said housing to said fluid suspension unit, a bore in said housing, a valve capsule mounted in said bore for axially sliding movement, an operating arm mounted on said housing and extending adjacent one end of said bore to interconnect said housing and the other of said members, at least two fluid chambers in said valve capsule, first port means connecting one of said fluid chambers to said first conduit means, second port means connecting another of said fluid chambers to said second conduit means, valving means within said valve capsule, said valving means including a valve seat between said fluid chambers and a poppet adapted to make sealing engagement with said valve seat, exhaust port means connected to said valving means, said valving means also including a shiftable valve rod operatively engaging said operating arm, said valve rod being operable in one position to shift said poppet away from said valve seat to allow fluid flow between said chambers to connect said fluid pressure source with said fluid suspension unit, said valve rod being operable in a second position to interconnect said second fluid chamber with said exhaust port means to exhaust fluid pressure from said fluid suspension unit, and means to shift said valve capsule between at least two axially spaced positions in said bore.

References Cited in the file of this patent

UNITED STATES PATENTS

| | | |
|---|---|---|
| 2,787,475 | Jackson | Apr. 2, 1957 |
| 2,959,426 | Augustin | Nov. 8, 1960 |

FOREIGN PATENTS

| | | |
|---|---|---|
| 1,020,770 | France | Nov. 19, 1952 |